(12) United States Patent
Zhou et al.

(10) Patent No.: US 12,555,081 B2
(45) Date of Patent: Feb. 17, 2026

(54) DEVICE REPAIRING METHOD AND SYSTEM, AND ELECTRONIC DEVICE AND NON-TRANSITORY STORAGE MEDIUM

(71) Applicant: SUZHOU METABRAIN INTELLIGENT TECHNOLOGY CO., LTD., Jiangsu (CN)

(72) Inventors: Hanfang Zhou, Jiangsu (CN); Shihui Li, Jiangsu (CN); Wenbin He, Jiangsu (CN); Shanbin Ai, Jiangsu (CN); Daotong Li, Jiangsu (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/961,995

(22) Filed: Nov. 27, 2024

(65) Prior Publication Data

US 2025/0094937 A1 Mar. 20, 2025

Related U.S. Application Data

(63) Continuation-in-part of application No. PCT/CN2023/132734, filed on Nov. 20, 2023.

(30) Foreign Application Priority Data

Dec. 27, 2022 (CN) .......................... 202211679804.X

(51) Int. Cl.
*G06Q 10/20* (2023.01)
*G06F 11/14* (2006.01)

(52) U.S. Cl.
CPC ......... *G06Q 10/20* (2013.01); *G06F 11/1417* (2013.01)

(58) Field of Classification Search
CPC .......................... G06Q 10/20; G06F 11/1417
(Continued)

(56) References Cited

U.S. PATENT DOCUMENTS

| 2016/0378602 A1* | 12/2016 | Herzi .................. G06F 11/1417 714/2 |
| 2019/0156298 A1 | 5/2019 | Ethington et al. |
| 2021/0089418 A1* | 3/2021 | Das Sharma ............. H04L 1/24 |

FOREIGN PATENT DOCUMENTS

| CN | 106681878 A | 5/2017 |
| CN | 106789323 A | 5/2017 |

(Continued)

*Primary Examiner* — Daniel Vetter
*Assistant Examiner* — Freda A Nelson
(74) *Attorney, Agent, or Firm* — IPro, PLLC

(57) ABSTRACT

A device repairing method includes: collecting a device-parameter set of a target device; based on the device-parameter set, determining whether a to-be-repaired component exists among a plurality of device components of the target device, to obtain a determination result; in response to the determination result indicating that the to-be-repaired component exists, repairing the to-be-repaired component by operating a preset port in the to-be-repaired component, to obtain a repairment result; and according to the repairment result, determining whether the to-be-repaired component is repaired, and in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold.

19 Claims, 5 Drawing Sheets

(58) Field of Classification Search
USPC .......................................... 705/305; 714/5.1
See application file for complete search history.

(56) References Cited

FOREIGN PATENT DOCUMENTS

| | | | | |
|---|---|---|---|---|
| CN | 108664361 A | | 10/2018 | |
| CN | 110457164 A | * | 11/2019 | .......... G06F 11/1441 |
| CN | 112948217 A | | 6/2021 | |
| CN | 113590511 A | * | 11/2021 | ......... G06F 13/4295 |
| CN | 113608603 A | * | 11/2021 | ......... G06F 13/4081 |
| CN | 114327967 A | | 4/2022 | |
| CN | 113176963 B | * | 11/2022 | ............ G06F 11/076 |
| CN | 115658375 A | | 1/2023 | |
| WO | 2016122904 A2 | | 8/2016 | |

* cited by examiner

DEVICE REPAIRING METHOD AND SYSTEM, AND ELECTRONIC DEVICE AND NON-TRANSITORY STORAGE MEDIUM

CROSS-REFERENCE TO RELATED APPLICATION

The present application claims the priority of the Chinese patent application filed on Dec. 27, 2022 before the CNIPA, China National Intellectual Property Administration with the application number of 202211679804.X and the title of "DEVICE REPAIRING METHOD, SYSTEM AND APPARATUS, AND ELECTRONIC DEVICE AND STORAGE MEDIUM", which is incorporated herein in its entirety by reference.

FIELD

The present application relates to the technical field of data processing and more particularly, to a device repairing method, system and apparatus, an electronic device, and a non-transitory storage medium.

BACKGROUND

Currently, the demand on BIOS adapted devices (for example, PCIe devices, among them, the PCIe refers to PCI-Express (peripheral component interconnect express), and is a high-speed serial computer expansion-bus standard) is continuously growing, and the problem of device speed decreasing and bandwidth decreasing easily happens. Furthermore, with the continuous growth of the consumer demand, the problem of device speed decreasing and bandwidth decreasing repeatedly happens, which consumes increasingly more manpower and time.

In the usage of servers, it is required to pay attention to the bandwidth parameter and the speed parameter of the BIOS adapted devices, which have very large influence on the performance of the devices. If the bandwidth or the speed of a device is abnormal, then the function of the device is affecting, and the device cannot be effectively used. The bandwidth of the device refers to the quantity of the Lanes (transmission channels) for implementing the data transmission. The speed of the device refers to the speed of each of the Lanes, for example, Gen 1(2.5 Gb/s), Gen 2(5 Gb/s), Gen 3(8 Gb/s) and Gen 4(16 Gb/s).

In the related art, the employed repairing method includes: acquiring a resource packet for hot updating, detecting the resource packet, to know that collapse will happen when hot updating is performed according to the resource packet, determining that it is required to perform degradation repairment, parsing to acquire the resource file in the resource packet, and loading the resource file to perform the hot updating, wherein the resource packet is a multi-terminal developed resource packet, and the resource file includes the contents or functions of the hot updating. The repairing method may implement the contents or functions of the hot updating by loading the resource file when it is detected that it is required to perform degradation repairment, to ensure the stability of the operation of the terminal device.

However, the repairing method in the related art has the following problems. Firstly, the device adaptation range is small, and the speed decreasing and bandwidth decreasing of the devices at the ends of the device link cannot be repaired. Secondly, the method relies on the loading of the resource packet, and is unstable.

The above problems have not been provided an effective solution yet.

SUMMARY

The embodiments of the present application provide a device repairing method, system and apparatus, an electronic device, and a non-transitory storage medium, to solve at least the technical problem in the related art that a device with speed decreasing and bandwidth decreasing cannot be effectively repaired.

According to one aspect of the embodiments of the present application, there is provided a device repairing method, wherein the method includes: collecting a device-parameter set of a target device; based on the device-parameter set, determining whether a to-be-repaired component exists among a plurality of device components of the target device, to obtain a determination result; in response to the determination result indicating that the to-be-repaired component exists, repairing the to-be-repaired component by operating a preset port in the to-be-repaired component, to obtain a repairment result, wherein the preset port is determined by counting up port data of all of ports within a historical time period; and determining whether the to-be-repaired component is repaired according to the repairment result, and in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period.

In some embodiments, the step of collecting the device-parameter set of the target device includes: collecting component parameters of all of the device components that are connected to the target device, to obtain the device-parameter set, wherein the component parameters include at least a speed parameter and a bandwidth parameter.

In some embodiments, the step of, based on the device-parameter set, determining whether the to-be-repaired component exists among the plurality of device components of the target device includes: for each of the device components, determining a preset speed value when the device component and the target device perform data transmission and a preset speed threshold associated with each of preset speed values; extracting the component parameters associated with the device component from the device-parameter set; in response to a value of the speed parameter among the component parameters being unequal to the preset speed value, determining whether the value of the speed parameter is less than the preset speed threshold; and in response to the value of the speed parameter being less than the preset speed threshold, determining that the device component is the to-be-repaired component.

In some embodiments, the step of, based on the device-parameter set, determining whether the to-be-repaired component exists among the plurality of device components of the target device further includes: for each of the device components, determining a preset bandwidth threshold when the device component and the target device perform data transmission; extracting the component parameters associated with the device component from the device-parameter set; and in response to a value of the bandwidth parameter among the component parameters being less than the preset bandwidth threshold, determining that the device component is the to-be-repaired component.

In some embodiments, the device components are deployed with a preset register, and the preset register is provided with the preset port.

In some embodiments, before the step of repairing the to-be-repaired component by operating the preset port in the to-be-repaired component, to obtain the repairment result, the method further includes: acquiring port data of all ports in the preset register; and based on the port data, determining the preset port from the all ports.

In some embodiments, the step of repairing the to-be-repaired component by operating the preset port in the to-be-repaired component, to obtain the repairment result includes: closing the preset port in the to-be-repaired component; in response to a closing duration reaching a first preset duration, opening the preset port in the to-be-repaired component; and in response to an opening duration reaching a second preset duration, obtaining the repairment result, wherein the repairment result is characterized by a degradation state, and the degradation state refers to decreasing of a data transmission speed or data transmission bandwidth between the to-be-repaired component and the target device.

In some embodiments, the step of closing the preset port in the to-be-repaired component includes: writing a preset port bit of the preset port to be a first preset value, wherein the first preset value is for characterizing execution of a closing operation to the preset port.

In some embodiments, the step of opening the preset port in the to-be-repaired component includes: writing a preset port bit of the preset port to be a second preset value, wherein the second preset value is for characterizing execution of an opening operation to the preset port.

In some embodiments, the step of determining whether the to-be-repaired component is repaired according to the repairment result includes: based on the degradation state, determining a current repairment probability; in response to the current repairment probability being less than a preset probability threshold, determining that the to-be-repaired component is not repaired; and in response to the current repairment probability being greater than or equal to the preset probability threshold, determining that the to-be-repaired component is repaired.

In some embodiments, after the step of repairing the to-be-repaired component by operating the preset port in the to-be-repaired component, to obtain the repairment result, the method further includes: updating the repairment result of the to-be-repaired component; and storing the repairment result that is updated to a preset log.

In some embodiments, after the repairment result indicates that the to-be-repaired component is repaired or the repairment time quantity reaches the preset time-quantity threshold, the method further includes: starting up a preset system in the target device.

In some embodiments, the target device is deployed with a preset system.

In some embodiments, the target device is provided with a plurality of external plug-in interfaces, and the external plug-in interfaces are for connecting the device components.

In some embodiments, the preset system is a basic input output system.

In some embodiments, the preset register is a link control register.

In some embodiments, the preset port is a link disabling port.

In some embodiments, the method further includes: controlling the link disabling port to guide a link training and status state machine to a disabling state, wherein the disabling state machine is configured for disabling device links of the target device, and the device links are links between the target device and the device components.

According to another aspect of the embodiments of the present application, there is further provided a device repairing system based on a preset system, wherein the system includes: a target device configured for, when repairment by a controller on the target device is completed, starting up the preset system, wherein the preset system is deployed in the target device, the target device is provided with a plurality of device components, the device components are deployed with a preset register, and the preset register is provided with a preset port; and the controller configured for collecting a device-parameter set of the target device; based on the device-parameter set, determining whether a to-be-repaired component exists among the plurality of device components, to obtain a determination result; in response to the determination result indicating that the to-be-repaired component exists, repairing the to-be-repaired component by operating the preset port in the to-be-repaired component, to obtain a repairment result; and determining whether the to-be-repaired component is repaired according to the repairment result, in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, and determining that repairment on the target device is completed, wherein the preset port is determined by counting up port data of all ports within a historical time period, and the preset time-quantity threshold is determined by analyzing a historical datum within the historical time period.

According to another aspect of the embodiments of the present application, there is further provided a device repairing apparatus, wherein the apparatus includes: a collecting unit configured for collecting a device-parameter set of a target device; a determining unit configured for, based on the device-parameter set, determining whether a to-be-repaired component exists among a plurality of device components of the target device, to obtain a determination result; a repairing unit configured for, in response to the determination result indicating that the to-be-repaired component exists, repairing the to-be-repaired component by operating a preset port in the to-be-repaired component, to obtain a repairment result, wherein the preset port is determined by counting up port data of all ports within a historical time period; and an executing unit configured for determining whether the to-be-repaired component is repaired according to the repairment result, and in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period.

In some embodiments, the collecting unit includes: a first collecting module configured for collecting component parameters of all of the device components that are connected to the target device, to obtain the device-parameter set, wherein the component parameters include at least a speed parameter and a bandwidth parameter.

In some embodiments, the determining unit includes: a first determining module configured for, for each of the device components, determining a preset speed value when the device component and the target device perform data transmission and a preset speed threshold associated with each of preset speed values; a first extracting module configured for extracting the component parameters associated with the device component from the device-parameter set; a first judging module configured for, in response to a value of the speed parameter among the component parameters being unequal to the preset speed value, determining whether the value of the speed parameter is less than the preset speed threshold; and a second determining module configured for, in response to the value of the speed parameter being less than the preset speed threshold, determining that the device component is the to-be-repaired component.

In some embodiments, the determining unit further includes: a third determining module configured for, for each of the device components, determining a preset bandwidth threshold when the device component and the target device perform data transmission; a second extracting module configured for extracting the component parameters associated with the device component from the device-parameter set; and a fourth determining module configured for, in response to a value of the bandwidth parameter among the component parameters being less than the preset bandwidth threshold, determining that the device component is the to-be-repaired component.

In some embodiments, the device components are deployed with a preset register, and the preset register is provided with the preset port.

In some embodiments, the device repairing apparatus further includes: a first acquiring module configured for, before the step of repairing the to-be-repaired component by operating the preset port in the to-be-repaired component, to obtain the repairment result, acquiring port data of all ports in the preset register; and a fifth determining module configured for, based on the port data, determining the preset port from the all ports.

In some embodiments, the repairing unit includes: a first closing module configured for closing the preset port in the to-be-repaired component; a first opening module configured for, in response to a closing duration reaching a first preset duration, opening the preset port in the to-be-repaired component; and a first outputting module configured for, if an opening duration reaches a second preset duration, obtaining the repairment result, wherein the repairment result is characterized by a degradation state, and the degradation state refers to decreasing of a data transmission speed or data transmission bandwidth between the to-be-repaired component and the target device.

In some embodiments, the first closing module includes: a first writing submodule configured for writing a preset port bit of the preset port to be a first preset value, wherein the first preset value is for characterizing execution of a closing operation to the preset port.

In some embodiments, the first opening module includes: a second writing submodule configured for writing a preset port bit of the preset port to be a second preset value, wherein the second preset value is for characterizing execution of an opening operation to the preset port.

In some embodiments, the executing unit includes: a sixth determining module configured for, based on the degradation state, determining a current repairment probability; a seventh determining module configured for, in response to the current repairment probability being less than a preset probability threshold, determining that the to-be-repaired component is not repaired; and an eighth determining module configured for, in response to the current repairment probability being greater than or equal to the preset probability threshold, determining that the to-be-repaired component is repaired.

In some embodiments, the device repairing apparatus further includes: a first updating module configured for, after the step of repairing the to-be-repaired component by operating the preset port in the to-be-repaired component, to obtain the repairment result, updating the repairment result of the to-be-repaired component; and a first storing module configured for storing the repairment result that is updated to a preset log.

In some embodiments, the device repairing apparatus further includes: a first starting-up module configured for, after the repairment result indicates that the to-be-repaired component is repaired or the repairment time quantity reaches the preset time-quantity threshold, starting up a preset system in the target device.

In some embodiments, the target device is deployed with a preset system.

In some embodiments, the target device is provided with a plurality of external plug-in interfaces, and the external plug-in interfaces are for connecting the device components.

In some embodiments, the preset system is a basic input output system.

In some embodiments, the preset register is a link control register.

In some embodiments, the preset port is a link disabling port.

In some embodiments, the device repairing apparatus further includes: a first controlling module configured for controlling the link disabling port to guide a link training and status state machine to a disabling state, wherein the disabling state machine is configured for disabling device links of the target device, and the device links are links between the target device and the device components.

According to another aspect of the embodiments of the present application, a non-transitory storage medium is further provided, wherein the non-transitory storage medium stores a computer program, and the computer program, when executed by a processor, implements the steps of the device repairing method stated above.

According to another aspect of the embodiments of the present application, an electronic device is further provided, including a memory, a processor, and a computer program that is stored in the memory and executable in the processor, wherein the processor, when executing the computer program, implements the steps of the device repairing method stated above.

The present disclosure includes collecting a device-parameter set of a target device; based on the device-parameter set, determining whether a to-be-repaired component exists among a plurality of device components of the target device, to obtain a determination result; if the determination result indicates that the to-be-repaired component exists, repairing the to-be-repaired component by operating a preset port in the to-be-repaired component, to obtain a repairment result; and determining whether the to-be-repaired component is repaired according to the repairment result, and if the to-be-repaired component is not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold. In the present application, it may be firstly determined whether the target device has a to-be-repaired component. If yes, then the preset port in the to-be-repaired component may be operated to perform the repairment. If the repairment does not succeed, then the operation on the preset port in the to-be-repaired component is repeated, till the to-be-repaired component is repaired or the repairment time quantity reaches the preset time-quantity threshold. The present application may automatically repair the problem of speed decreasing and bandwidth decreasing of the device, which increases the efficiency of repairment, thereby solving the technical problem in the related art that a device with speed decreasing and bandwidth decreasing cannot be effectively repaired.

BRIEF DESCRIPTION OF THE DRAWINGS

The drawings illustrated herein are intended to provide understanding of the present application, and form part of the present application. The illustrative embodiments of the present application and their explanation are intended to interpret the present application, and do not inappropriately limit the present application. In the drawings.

DETAILED DESCRIPTION

In order to enable a person skilled in the art to better comprehend the solutions of the present application, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work should fall within the protection scope of the present application.

It should be noted that the terms "first", "second" and so on in the description, the claims and the drawings of the present application are intended to distinguish similar objects, and are not necessarily used to describe a particular order or sequence. It should be understood that the data so used may be interchanged in suitable cases, whereby the embodiments of the present application described herein may be implemented in other sequences than those illustrated or described herein. Furthermore, the terms "include/comprise" and "have" and any variation thereof are intended to cover non-exclusive inclusions. For example, a process, method, system, product or device that includes a series of steps or units is not necessarily limited to those steps or units clearly listed, but may include other steps or units that are not clearly listed or that are inherent to the process, method, product or device.

It should be noted that the present application illustrates with reference to a server architecture of the Intel platform, but it is not limited to the servers of the Intel platform, or limited to server systems, but may still be used in the server systems of other platforms or in other computer systems.

In order to facilitate a person skilled in the art to understand the present application, some of the terms or nouns involved in the embodiments of the present application will be explained below:

BIOS: Base Input/Output System, is a basic input output system.
TargetLinkSpeed: the target link speed.
CurrentLinkSpeed: the current link speed.
MaxLink Width: the maximum link width.
NegotiatedLink Width: the negotiated link width.
LinkSta (LinkState): the link state.
Linkcap (Link Capabilities): the link performance.
Gen: the speed of the transmission of bit streams by the PCIe hardware link.
ARI (Alternative Routing-ID Interpretation): alternative routing information.
ASPM (Active State Power Management): active-state power-supply management.
LTSSM (Link Training and Status State Machine): link training and status state machine.
Link Disable: a link disabling port.
PCI Express: a high-speed serial computer expansion-bus standard.
Retrain link: retraining link.
Recovery: recovery.
Configuration: the configuration.

Figure 1:
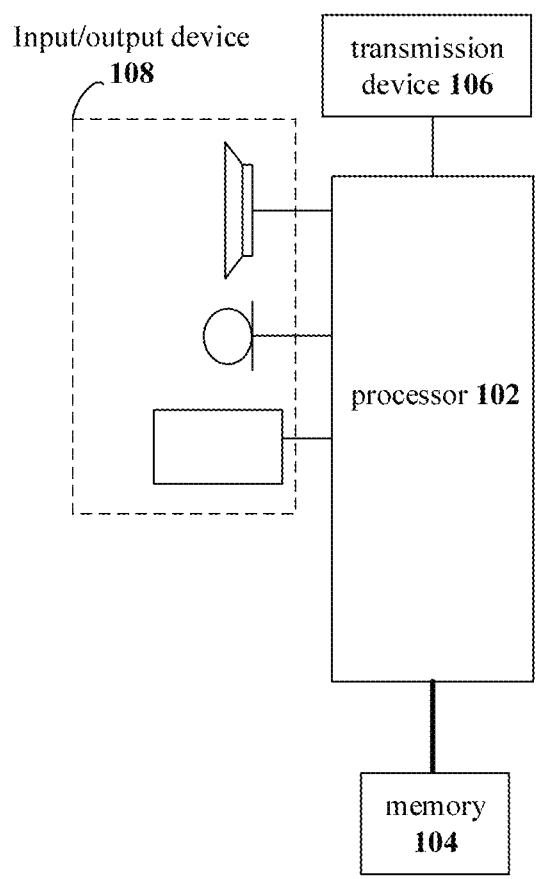
FIG. 1 is a block diagram of the hardware structure of a mobile terminal for a device repairing method according to an embodiment of the present application.

The embodiments of the device repairing method according to the embodiments of the present application may be implemented in a mobile terminal, a computer terminal or a similar computing device. Taking the case as an example in which they are implemented in a mobile terminal, FIG. 1 is a block diagram of the hardware structure of a mobile terminal for a device repairing method according to an embodiment of the present application. As shown in FIG. 1, the mobile terminal may include one or more (FIG. 1 shows merely one) processors 102 (the processors 102 may include but are not limited to a processing device such as a microprocessor MCU or a programmable logic device FPGA) and a memory 104 configured for storing data. The mobile terminal may further include a transmission device 106 for the communicate function and an inputting-outputting device 108. A person skilled in the art may understand that the structure shown in FIG. 1 is merely illustrative, and does not limit the structure of the mobile terminal. For example, the mobile terminal may also include more or fewer components than those shown in FIG. 1, or have a different configuration from that shown in FIG. 1.

The memory 104 is configured for storing a computer program, for example, the software programs and modules of an application software, for example, a computer program corresponding to the device repairing method according to the embodiments of the present application. The processors 102 execute the computer program stored in the memory 104, so as to execute various function applications and data processing, i.e., implementing the device repairing method stated above. The memory 104 may include a high-speed random access memory, and may also include a non-transitory memory, for example, one or more magnetic storing devices, flash memories, or other non-transitory solid-state memories. In some embodiments, the memory 104 may include memories provided remotely to the processors 102, and those remote memories may be connected to the mobile terminal via a network. Examples of the network include but are not limited to the Internet, an enterprise intranet, a local area network, a mobile communication net and a combination thereof.

The transmission device 106 is configured for receiving or emitting data via a network. The examples of the network may include a wireless network supplied by the communication supplier of the mobile terminal. In an embodiment, the transmission device 106 includes a network adaptor (Network Interface Controller, referred to for short as NIC), which may be connected to other network devices via a base station so as to communicate with the Internet. In an embodiment, the transmission device 106 may be a Radio Frequency (referred to for short as RF) module, which is configured for communicating with the Internet wirelessly.

The present application provides a method for repairing device speed decreasing and bandwidth decreasing, which may automatically disable the ports of the Link Control Register (i.e., the link control register) of the device and then open the ports, try repairing by a preset time quantity (for example, 3 times, which may be set according to practical situations), and subsequently continue to start up the BIOS system.

In the present application, what is executed is the port in the BIOS system that easily has problems (i.e., Bit4 (i.e., the Link Disable port) of the Link Control Register).

The present application will be described in detail below with reference to the embodiments.

According to the embodiments of the present application, there are provided embodiments of the device repairing method that are implemented in the above-described mobile terminal. It should be noted that the steps shown in the flow chart of the drawings may be implemented in, for example, a computer system of a group of computer-executable instructions, and, although the flow charts show the logic sequences, in some cases, the illustrated or described steps may be executed in sequences different from the sequences used herein.

Figure 2:
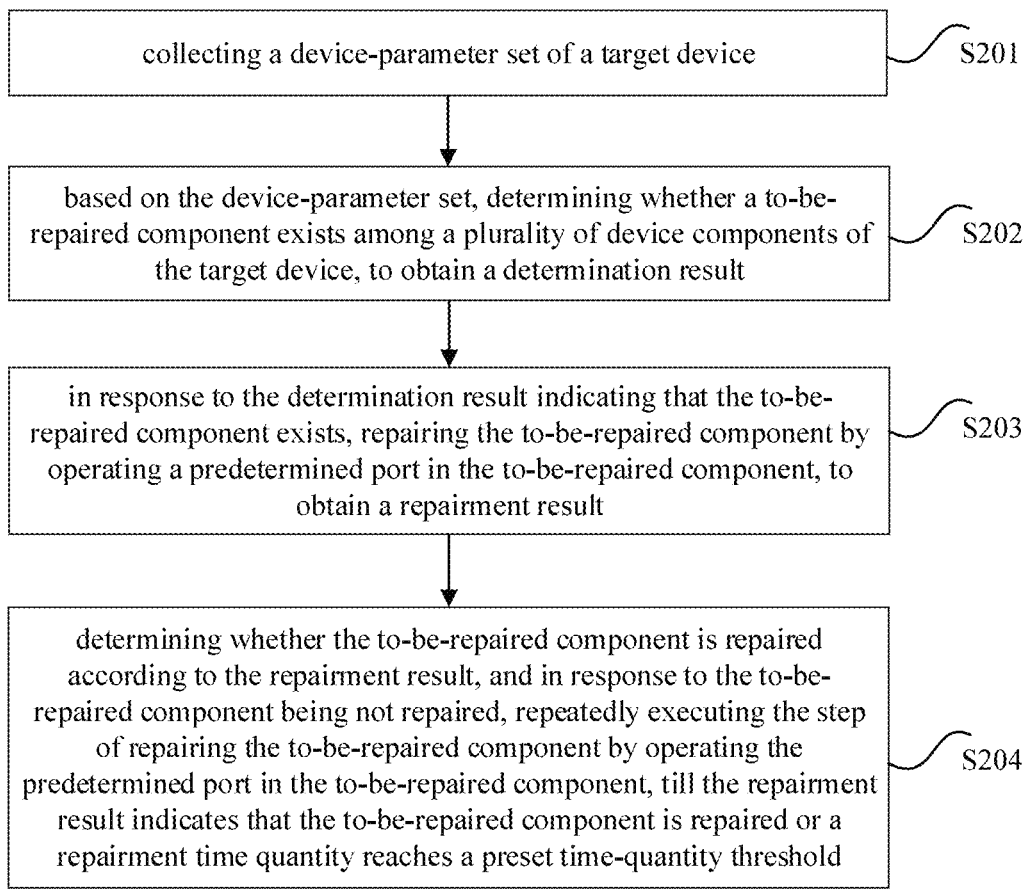
FIG. 2 is a flow chart of an alternative device repairing method according to an embodiment of the present application.

FIG. 2 is a flow chart of an alternative device repairing method according to an embodiment of the present application. As shown in FIG. 2, the method includes the following steps:

Step S201: collecting a device-parameter set of a target device.

Step S202: based on the device-parameter set, determining whether a to-be-repaired component exists among a plurality of device components of the target device, to obtain a determination result.

Step S203: in response to the determination result indicating that the to-be-repaired component exists, repairing the to-be-repaired component by operating a preset port in the to-be-repaired component, to obtain a repairment result, wherein the preset port is determined by counting up port data of all of ports within a historical time period.

Step S204: determining whether the to-be-repaired component is repaired according to the repairment result, and in response to the to-be-repaired component is not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period.

By the above steps, it may collect a device-parameter set of a target device; based on the device-parameter set, determine whether a to-be-repaired component exists among a plurality of device components of the target device, to obtain a determination result; if the determination result indicates that the to-be-repaired component exists, by operating a preset port in the to-be-repaired component, repair the to-be-repaired component, to obtain a repairment result; and determine whether the to-be-repaired component is repaired, and if the to-be-repaired component is not repaired according to the repairment result, repeatedly execute the step of repairing the to-be-repaired component by operating the preset port in the to-be-repaired component, till the repairment result indicates that the to-be-repaired component is repaired or a repairment time quantity reaches a preset time-quantity threshold. In the present application, it may be firstly determined whether the target device has a to-be-repaired component. If yes, then the preset port in the to-be-repaired component may be operated to perform the repairment. If the repairment does not succeed, then the operation on the preset port in the to-be-repaired component is repeated, till the to-be-repaired component is repaired or the repairment time quantity reaches the preset time-quantity threshold. The present application may automatically repair the problem of speed decreasing and bandwidth decreasing of the device, which increases the efficiency of repairment, thereby solving the technical problem in the related art that a device with speed decreasing and bandwidth decreasing cannot be effectively repaired.

The embodiments of the present application will be described in detail below with reference to the above steps.

Figure 6:
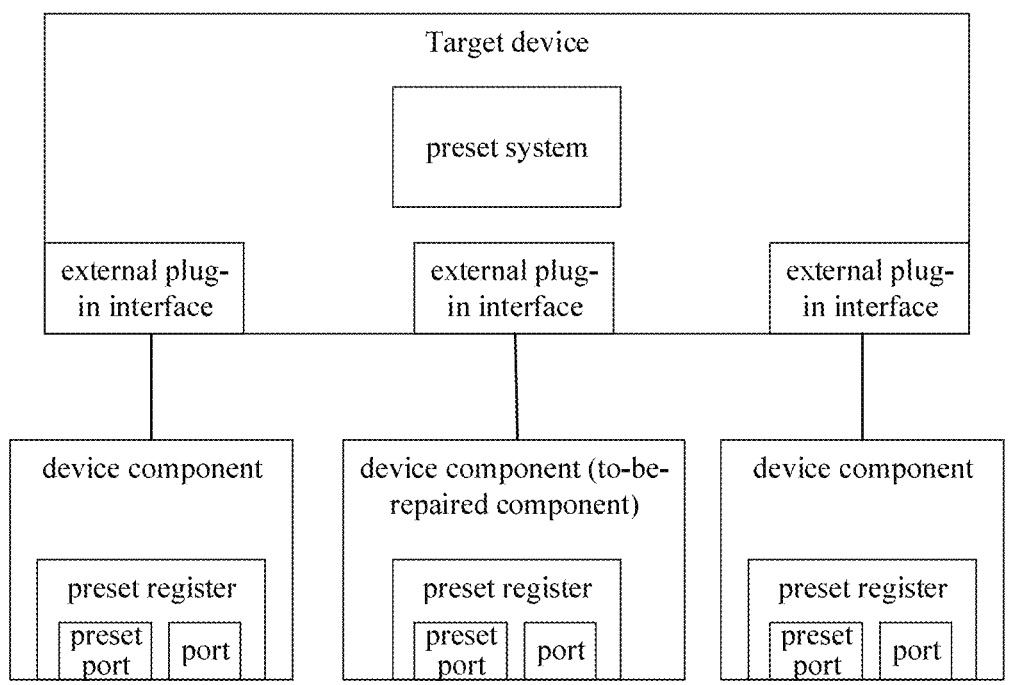
FIG. 6 is a block diagram of structures of a target device and a plurality of device components according to an embodiment of the present application.

In an alternative embodiment, referring to FIG. 6, the target device is deployed with a preset system.

In another alternative embodiment, the preset system is a basic input output system.

In the present embodiment, the target device is a device adapted for the BIOS system (i.e., the preset system, which is also the basic input output system), for example, a PCIe device.

In some embodiments, referring to FIG. 6, the target device is provided with a plurality of external plug-in interfaces, and the external plug-in interfaces are for connecting the device components.

In the present embodiment, the target device may be provided with a plurality of external plug-in interfaces, and those external plug-in interfaces are configured for connecting the device components (in other words, the target device may have a plurality of external device components plugged in, for example, an externally inserted card).

Step S201: collecting a device-parameter set of a target device.

In some embodiments, the step of collecting the device-parameter set of the target device includes: collecting component parameters of all of the device components that are connected to the target device, to obtain the device-parameter set, among them, the component parameters include at least a speed parameter and a bandwidth parameter.

In the embodiments of the present application, the device-parameter set of the target device may be periodically automatically collected, to determine whether the target device has the problem of speed decreasing and bandwidth decreasing according to the collected device-parameter set, which may include firstly collecting the component parameters (including the speed parameter, the bandwidth parameter and so on) of all of the device components that are connected to the target device, to obtain the device-parameter set.

Step S202: based on the device-parameter set, determining whether a to-be-repaired component exists among a plurality of device components of the target device, to obtain a determination result.

In the embodiments of the present application, the method may include, according to the device-parameter set, determining whether a to-be-repaired component (i.e., a device component that has the problem of speed decreasing and bandwidth decreasing) exists among the plurality of device components of the target device, to obtain a determination result. The determination may be performed by using a preset determination standard of speed decreasing and a preset determination standard of bandwidth decreasing.

In some embodiments, the step of, based on the device-parameter set, determining whether the to-be-repaired component exists among the plurality of device components of the target device includes: for each of the device components, determining a preset speed value when the device component and the target device perform data transmission and a preset speed threshold associated with each of the preset speed values; extracting the component parameters associated with the device component from the device-parameter set; if a value of the speed parameter among the component parameters is unequal to the preset speed value, determining whether the value of the speed parameter is less than the preset speed threshold; and if the value of the speed parameter is less than the preset speed threshold, determining that the device component is the to-be-repaired component.

In the embodiments of the present application, the method may include, by using the preset determination standard of speed decreasing, determining whether a to-be-repaired component exists among a plurality of device components of the target device. The determination standard of speed decreasing may include firstly, for each of the device components, determining the preset speed value when the device component and the target device perform data transmission (i.e., the normal parameter) and a preset speed threshold associated with each of the preset speed values, subsequently reading the LinkSta parameter and the Linkcap parameter (i.e., the component parameters) of an external plug-in device component (i.e., extracting the component parameters associated with the device component from the device-parameter set), and, if the read component parameters are the same as the normal parameters, then determining that no repairment is required; and if the read component parameters are different from the normal parameters, and the value of the speed parameter among the component parameters is less than the preset speed threshold (for example, Gen3) (i.e., if the value of the speed parameter among the component parameters is unequal to the preset speed value, determining whether the value of the speed parameter is less than the preset speed threshold; and if the value of the speed parameter is less than the preset speed threshold, determining that the device component is the to-be-repaired component), then executing the repairing step.

In some embodiments, the step of, based on the device-parameter set, determining whether the to-be-repaired component exists among the plurality of device components of the target device further includes: for each of the device components, determining a preset bandwidth threshold when the device component and the target device perform data transmission; extracting the component parameters associated with the device component from the device-parameter set; and if a value of the bandwidth parameter among the component parameters is less than the preset bandwidth threshold, determining that the device component is the to-be-repaired component.

In the embodiments of the present application, the method may include, by using the preset determination standard of bandwidth decreasing, determining whether the to-be-repaired component exists among the plurality of device components of the target device. The determination standard of bandwidth decreasing may include firstly, for each of the device components, determining the preset bandwidth threshold when the device component and the target device perform data transmission, subsequently extracting the component parameters associated with the device component from the device-parameter set (i.e., reading the LinkSta parameter and the Linkcap parameter of an external plug-in device component), and, if the value of the bandwidth parameter among the component parameters is less than the preset bandwidth threshold (for example, the preset bandwidth threshold is the minimum bandwidth value of the uplink and downlink ports), determining that the device component is the to-be-repaired component, and it is required to execute the repairing step.

In some embodiments, referring to FIG. 6, the device components are deployed with a preset register, and the preset register is provided with the preset port.

In another alternative embodiment, the preset register is a link control register.

In another alternative embodiment, the preset port is a link disabling port.

In the embodiments of the present application, the device components are provided with a preset register (i.e., the link control register), and the preset register has the preset port (the link disabling port).

In some embodiments, the method further includes controlling the link disabling port to guide a link training and status state machine to a disabling state, among them, the disabling state machine is configured for disabling device links of the target device, and the device links are links between the target device and the device components.

In the embodiments of the present application, the Link Disable port (i.e., the link disabling port) may, in configuring, disable the link by guiding LTSSM to the Disabled state (i.e., the link disabling port may be controlled to guide a link training and status state machine to a disabling state, wherein the disabling state machine is configured for disabling device links of the target device, wherein the device links are links between the target device and the device components). In addition, the port bit of the link disabling port may be maintained at the terminal, the PCI Express and the upstream port of the exchange. The writing to the port bit may be immediately reflected in the value read from the port bit, no matter what the actual link state is. After the port bit is removed, the software must follow the defined requirement on the time sequence of the first time of configuration reading after routine resetting.

In some embodiments, before the step of repairing the to-be-repaired component by operating the preset port in the to-be-repaired component, to obtain the repairment result, the method further includes: acquiring port data of all ports in the preset register; and based on the port data, determining the preset port from the all ports.

In the embodiments of the present application, the port required to be operated may be firstly determined, which may include firstly acquiring the port data of all of the ports in the preset register, and subsequently performing an experimentation operation by using the port data, to, from all of the ports, determine the preset port having the optimum experimentation effect.

In the embodiments of the present application, the compatibility between the software and the ARI device (Alternative Routing-ID Interpretation, i.e., alternative Routing ID (routing identifier), is a mechanism that intends to replace some or all of the Routing IDs (identity documents, or identifiers)) is demonstrated by the ASPM (Active State Power Management) control field, the common-clock configuration bit and the enabled-clock power-supply management bit in the link control register, which has a potential problem in the software compatibility with the ARI device, because those controls strictly close the configurations in the functions, rather than the configurations of all of the functions. With the compatible software, the common-clock configuration bit should have no problem, because the software requires configuring, in all of the functions, that that bit is the same. When the enabled-clock power-supply management bit is used, the software configuring that bit in all of the functions should have no problem in the compatibility. However, if the software does not configure the same bit in all of the functions, and relies that each of the functions has the capacity of preventing the clock-power-supply management from being enabled, then such software might have the problem in the compatibility with the ARI device. When the ASPM control field is used, if the software configures that bit to be the same in all of the functions, then the problem of compatibility should not exist. However, if the software does not configure the same bit in all of the functions, and relies that each of the functions in the operating state has the capacity of preventing the ASPM from being enabled, then such software might have the problem in the compatibility.

When the RetrainLink controlling parameter (i.e., the retraining-link controlling parameter) is changed, and one byte is written into the Retrain Link bit, when the link training is started up by using the new parameter configuration, it is required to avoid some race conditions. At any moment, because of the normal link activities, the LTSSM might transit to the state of Recovery or Configuration without software sensing. If, when the software writes the updated parameters (for example, the RetrainLink controlling parameter) into the link control register and the Retrain Link bit, the LTSSM has already been in the state of Recovery or Configuration, then the LTSSM might not use the updated parameter configuration together with the current link training, and the current link training may not reach the result expected by the software. Therefore, the present embodiment employs the Link Disable port for the configuring.

Step S203: in response to the determination result indicating that the to-be-repaired component exists, repairing the to-be-repaired component by operating a preset port in the to-be-repaired component, to obtain a repairment result, wherein the preset port is determined by counting up port data of all of ports within a historical time period.

In some embodiments, the step of repairing the to-be-repaired component by operating the preset port in the to-be-repaired component, to obtain the repairment result includes: closing the preset port in the to-be-repaired component; if a closing duration reaches a first preset duration, opening the preset port in the to-be-repaired component; and if an opening duration reaches a second preset duration, obtaining the repairment result, wherein the repairment result is characterized by a degradation state, wherein the degradation state refers to decreasing of a data transmission speed or data transmission bandwidth between the to-be-repaired component and the target device.

In the embodiments of the present application, the to-be-repaired component may be repaired by operating the preset port in the to-be-repaired component, to obtain the repairment result, which may include firstly closing the preset port in the to-be-repaired component, after the closing duration has reached a first preset duration (for example, 100 ms), opening the preset port in the to-be-repaired component, and, subsequently, after the opening duration has reached a second preset duration (for example, 100 ms), obtaining the repairment result. For example, the ports of the Link Control Register are disabled for 100 ms, and subsequently the ports of the Link Control Register are enabled for 100 ms. In the present embodiment, the repairment result is characterized by a degradation state, wherein the degradation state refers to decreasing of the data transmission speed or data transmission bandwidth between the to-be-repaired component and the target device.

In some embodiments, the step of closing the preset port in the to-be-repaired component includes: writing a preset port bit of the preset port to be a first preset value, wherein the first preset value is for characterizing execution of a closing operation to the preset port.

In the embodiments of the present application, a preset port bit of the preset port may be written to be a first preset value (the first preset value is for characterizing the execution of a closing operation to the preset port, for example, writing the port bit to be 0).

In some embodiments, the step of opening the preset port in the to-be-repaired component includes: writing a preset port bit of the preset port to be a second preset value, wherein the second preset value is for characterizing execution of an opening operation to the preset port.

In the embodiments of the present application, a preset port bit of the preset port may be written to be a second preset value (the second preset value is for characterizing the execution of an opening operation to the preset port, for example, writing the port bit to be 1).

Step S204: determining whether the to-be-repaired component is repaired according to the repairment result, and in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period.

In some embodiments, the step of determining whether the to-be-repaired component is repaired according to the repairment result includes: based on the degradation state, determining a current repairment probability; if the current repairment probability is less than a preset probability threshold, determining that the to-be-repaired component is not repaired; and if the current repairment probability is greater than or equal to the preset probability threshold, determining that the to-be-repaired component is repaired.

In the embodiments of the present application, after the repairment result is obtained, the method may include, based on the repairment result, determining again, according to the determination standards of speed decreasing and bandwidth decreasing, whether degradation happens, and, if the problem of degradation still exists, then executing the repairment, by disabling the ports of the Link Control Register for the first preset duration, and enabling the ports of the Link Control Register for the second preset duration.

In the present embodiment, repairment counting-up printing may be added. Every time the state of device speed decreasing and bandwidth decreasing is identified one time, it is recorded one time, and the states of the speed and the bandwidth before and after the repairment are collected. The repairment states, the repairment time quantity, the probability with which the repairment is completed, and so on, of the device components may be acquired from a serial-port log.

In the present embodiment, the method may include determining whether the to-be-repaired component is repaired according to the repairment result, which may include determining the current repairment probability according to the degradation state, wherein if the current repairment probability is less than the preset probability threshold, then it may be determined that the to-be-repaired component is not repaired; and if the current repairment probability is greater than or equal to the preset probability threshold, then it may be determined that the to-be-repaired component is repaired.

In some embodiments, after the step of repairing the to-be-repaired component by operating the preset port in the to-be-repaired component, to obtain the repairment result, the method further includes: updating the repairment result of the to-be-repaired component; and storing the repairment result that is updated to a preset log.

In the embodiments of the present application, after each time of the repairment, the repairment result of the to-be-repaired component may be updated, and the repairment result that is updated may be stored to a preset log (for example, a serial-port log).

In some embodiments, after the repairment result indicates that the to-be-repaired component is repaired or the repairment time quantity reaches the preset time-quantity threshold, the method further includes: starting up a preset system in the target device.

In the embodiments of the present application, if the to-be-repaired component is repaired or the repairment time quantity reaches the preset time-quantity threshold (for example, 3 times), the preset system in the target device may continue to be started up.

The present application will be described in detail below with reference to another alternative embodiment.

Figure 3:
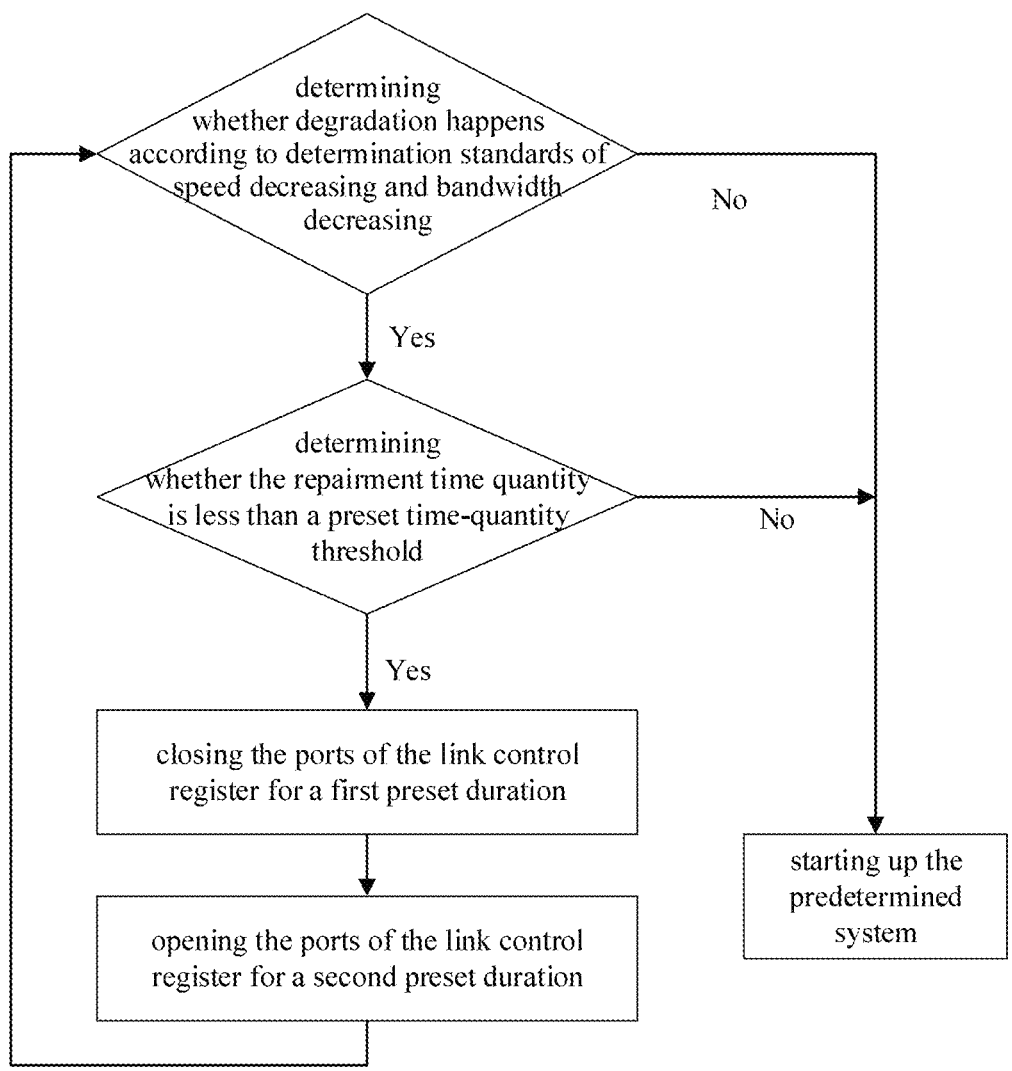
FIG. 3 is a schematic diagram of an alternative process of the repairment of the speed decreasing and bandwidth decreasing of a device according to an embodiment of the present application.

FIG. 3 is a schematic diagram of an alternative process of the repairment of the speed decreasing and bandwidth decreasing of a device according to an embodiment of the present application. As shown in FIG. 3, the method includes the following process:

(1) determining, according to determination standards of speed decreasing and bandwidth decreasing, whether degradation happens;
(2) if degradation happens, determining whether the repairment time quantity is less than a preset time-quantity threshold; and if degradation does not happen, then directly starting up the preset system;
(3) if the repairment time quantity is less than the preset time-quantity threshold, then executing the repairment; and if the repairment time quantity is greater than or equal to the preset time-quantity threshold, then directly starting up the preset system;
(4) closing the ports of the link control register for a first preset duration;
(5) opening the ports of the link control register for a second preset duration; and
(6) continuing to determine, according to the determination standards of speed decreasing and bandwidth decreasing, whether degradation happens, and executing the subsequent process.

The embodiments of the present application provide a solution for repairing device speed decreasing and bandwidth decreasing, which may increase the efficiency of the treatment and the repairment of device speed decreasing and bandwidth decreasing, reduce the human cost, improve the effect of the BIOS repairment, and reduce the cost in the repairment, so as to reach the following advantageous effects. Firstly, by closing the ports of the link control register and subsequently opening the ports, the state machine may be more stable, and the starting-up time may be saved. Secondly, the time-delay duration and the repairment time quantity are verified repeatedly, which cannot only realize the treatment on device speed decreasing and bandwidth decreasing, so as not to interfere the normal operation of the code, but also may increase the repairment probability to the largest extent. Thirdly, by using the solution of speed decreasing and bandwidth decreasing, the manpower consumption on the problem of device degradation by facilities may be saved, which saves the comprehensive cost.

From the description on the above embodiments, a person skilled in the art may clearly know that the method according to the above embodiments may be implemented by means of software plus a necessary generic hardware platform, and, certainly, may also be implemented by hardware, but in many circumstances the former is an alternative embodiment. On the basis of such a comprehension, the substance of the technical solutions of the present application, or the part thereof that makes a contribution over the prior art, may be embodied in the form of a software product. The computer software product is stored in a non-transitory storage medium (such as a ROM/RAM, a diskette and an optical disk), and contains multiple instructions configured so that a terminal device (which may be a mobile phone, a computer, a server, a network device and so on) implements the methods according to the embodiments of the present application.

The present application will be described in detail below with reference to another embodiment.

The present embodiment further provides a device repairing apparatus, wherein the device repairing apparatus is configured for implementing the above embodiments and alternative embodiments, wherein what have been described are not discussed further. As used below, the term "module" may implement the combination of software and/or hardware of preset functions. Although the apparatus described in the following embodiments is implemented in some embodiments with software, implementation of hardware, or a combination of software and hardware, is also feasible and envisaged.

Figure 4:
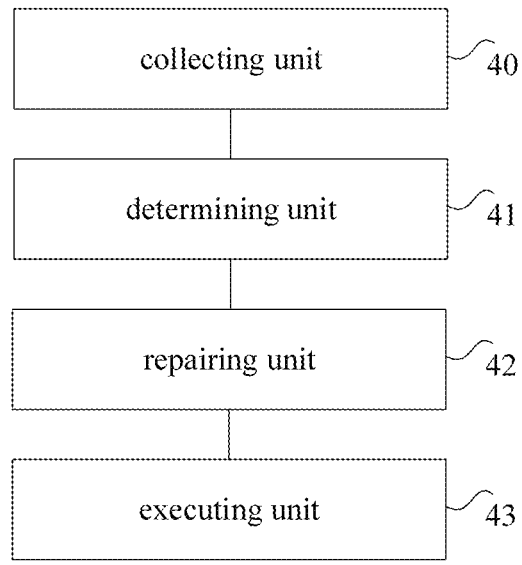
FIG. 4 is a schematic diagram of an alternative device repairing apparatus according to an embodiment of the present application.

FIG. 4 is a schematic diagram of an alternative device repairing apparatus according to an embodiment of the present application. As shown in FIG. 4, the device repairing apparatus may include a collecting unit 40, a determining unit 41, a repairing unit 42 and an executing unit 43.

The collecting unit 40 is configured for collecting a device-parameter set of a target device;

the determining unit 41 is configured for, based on the device-parameter set, determining whether a to-be-repaired component exists among a plurality of device components of the target device, to obtain a determination result;

the repairing unit 42 is configured for, if the determination result indicates that the to-be-repaired component exists, repairing the to-be-repaired component by operating a preset port in the to-be-repaired component, to obtain a repairment result, wherein the preset port is determined by counting up port data of all of ports within a historical time period; and the executing unit 43 is configured for determining whether the to-be-repaired component is repaired according to the repairment result, and if the to-be-repaired component is not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period.

The device repairing apparatus may, by using the collecting unit 40, collect a device-parameter set of a target device; by using the determining unit 41, based on the device-parameter set, determine whether a to-be-repaired component exists among a plurality of device components of the target device, to obtain a determination result; by using the repairing unit 42, if the determination result indicates that the to-be-repaired component exists, by operating a preset port in the to-be-repaired component, repair the to-be-repaired component, to obtain a repairment result; and by using the executing unit 43, determine whether the to-be-repaired component is repaired according to the repairment result, and if the to-be-repaired component is not repaired, repeatedly execute the step of repairing the to-be-repaired component by operating the preset port in the to-be-repaired component, till the repairment result indicates that the to-be-repaired component is repaired or a repairment time quantity reaches a preset time-quantity threshold. In the present application, it may be firstly determined whether the target device has a to-be-repaired component. If yes, then the preset port in the to-be-repaired component may be operated to perform the repairment. If the repairment does not succeed, then the operation on the preset port in the to-be-repaired component is repeated, till the to-be-repaired component is repaired or the repairment time quantity reaches the preset time-quantity threshold. The present application may automatically repair the problem of speed decreasing and bandwidth decreasing of the device, which increases the efficiency of repairment, thereby solving the technical problem in the related art that a device with speed decreasing and bandwidth decreasing cannot be effectively repaired.

In some embodiments, the collecting unit includes: a first collecting module configured for collecting component parameters of all of the device components that are connected to the target device, to obtain the device-parameter set, wherein the component parameters include at least a speed parameter and a bandwidth parameter.

In some embodiments, the determining unit includes: a first determining module configured for, for each of the device components, determining a preset speed value when the device component and the target device perform data transmission and a preset speed threshold associated with each of the preset speed values; a first extracting module configured for extracting the component parameters associated with the device component from the device-parameter set; a first judging module configured for, if a value of the speed parameter among the component parameters is unequal to the preset speed value, determining whether the value of the speed parameter is less than the preset speed threshold; and a second determining module configured for, if the value of the speed parameter is less than the preset speed threshold, determining that the device component is the to-be-repaired component.

In some embodiments, the determining unit further includes: a third determining module configured for, for each of the device components, determining a preset bandwidth threshold when the device component and the target device perform data transmission; a second extracting module configured for extracting the component parameters associated with the device component from the device-parameter set; and a fourth determining module configured for, if a value of the bandwidth parameter among the component parameters is less than the preset bandwidth threshold, determining that the device component is the to-be-repaired component.

In some embodiments, the device components are deployed with a preset register, and the preset register is provided with the preset port.

In some embodiments, the device repairing apparatus further includes: a first acquiring module configured for, before the step of repairing the to-be-repaired component by operating the preset port in the to-be-repaired component, to obtain the repairment result, acquiring port data of all ports in the preset register; and a fifth determining module configured for, based on the port data, determining the preset port from the all ports.

In some embodiments, the repairing unit includes: a first closing module configured for closing the preset port in the to-be-repaired component; a first opening module configured for, if a closing duration reaches a first preset duration, opening the preset port in the to-be-repaired component; and a first outputting module configured for, if an opening duration reaches a second preset duration, obtaining the repairment result, wherein the repairment result is characterized by a degradation state, and the degradation state refers to decreasing of a data transmission speed or data transmission bandwidth between the to-be-repaired component and the target device.

In some embodiments, the first closing module includes: a first writing submodule configured for writing a preset port bit of the preset port to be a first preset value, wherein the first preset value is for characterizing execution of a closing operation to the preset port.

In some embodiments, the first opening module includes: a second writing submodule configured for writing a preset port bit of the preset port to be a second preset value, wherein the second preset value is for characterizing execution of an opening operation to the preset port.

In some embodiments, the executing unit includes: a sixth determining module configured for, based on the degradation state, determining a current repairment probability; a seventh determining module configured for, if the current repairment probability is less than a preset probability threshold, determining that the to-be-repaired component is not repaired; and an eighth determining module configured for, if the current repairment probability is greater than or equal to the preset probability threshold, determining that the to-be-repaired component is repaired.

In some embodiments, the device repairing apparatus further includes: a first updating module configured for, after the step of repairing the to-be-repaired component by operating the preset port in the to-be-repaired component, to obtain the repairment result, updating the repairment result of the to-be-repaired component; and a first storing module configured for storing the repairment result that is updated to a preset log.

In some embodiments, the device repairing apparatus further includes: a first starting-up module configured for, after the repairment result indicates that the to-be-repaired component is repaired or the repairment time quantity reaches the preset time-quantity threshold, starting up a preset system in the target device.

In some embodiments, the target device is deployed with a preset system.

In some embodiments, the target device is provided with a plurality of external plug-in interfaces, and the external plug-in interfaces are for connecting the device components.

In some embodiments, the preset system is a basic input output system.

In some embodiments, the preset register is a link control register.

In some embodiments, the preset port is a link disabling port.

In some embodiments, the device repairing apparatus further includes:
  a first controlling module configured for controlling the link disabling port to guide a link training and status state machine to a disabling state, wherein the disabling state machine is configured for disabling device links of the target device, and the device links are links between the target device and the device components.

The device repairing apparatus may further include a processor and a memory, all of the collecting unit 40, the determining unit 41, the repairing unit 42, the executing unit 43 and so on are stored in the memory as program units, and the processor executes the program units stored in the memory to implement the corresponding functions.

The processor includes a kernel, and the kernel invokes the corresponding program units from the memory. The kernel may be one or more kernels, and the kernel parameters are regulated to implement the operations of determining whether the to-be-repaired component is repaired according to the repairment result, and if the to-be-repaired component is not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period.

The memory may include the forms of computer-readable media such as a non-permanent memory, a Random Access Memory (RAM) and/or a non-transitory internal memory, for example, a read-only memory (ROM) or a flash memory (flash RAM). The memory includes at least one storage chip.

The present application further provides a computer program product, which, when executed in a data processing device, is adapted for executing a program initialized with the method steps of: collecting a device-parameter set of a target device; based on the device-parameter set, determining whether a to-be-repaired component exists among a plurality of device components of the target device, to obtain a determination result; if the determination result indicates that the to-be-repaired component exists, repairing the to-be-repaired component by operating a preset port in the to-be-repaired component, to obtain a repairment result; and determining whether the to-be-repaired component is repaired according to the repairment result, and if the to-be-repaired component is not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold.

It should be noted that the above modules may be implemented by software or hardware. The latter may be implemented in the following modes but is not limited thereto: all of the above modules are located in the same one processor, or the above modules are located in different processors in any combinations.

According to another aspect of the embodiments of the present application, there is further provided a device repairing system based on a preset system, wherein the system includes: a target device configured for, when repairment by a controller on the target device is completed, starting up the preset system, wherein the preset system is provided in the target device, the target device is provided with a plurality of device components, the device components are provided with a preset register, and the preset register has a preset port; and the controller configured for collecting a device-parameter set of the target device; based on the device-parameter set, determining whether a to-be-repaired component exists among the plurality of device components, to obtain a determination result; if the determination result indicates that the to-be-repaired component exists, repairing the to-be-repaired component by operating the preset port in the to-be-repaired component, to obtain a repairment result; and determining whether the to-be-repaired component is repaired according to the repairment result, if the to-be-repaired component is not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, and determining that repairment on the target device is completed, wherein the preset port is determined by counting up port data of all of ports within a historical time period, and the preset time-quantity threshold is determined by analyzing a historical datum within the historical time period.

According to another aspect of the embodiments of the present application, there is further provided a non-transitory storage medium, wherein the non-transitory storage medium stores a computer program, and the computer program, when executed by a processor, implements the steps of the device repairing method stated above.

According to another aspect of the embodiments of the present application, there is further provided an electronic device, including a memory, a processor, and a computer program that is stored in the memory and executable in the processor, wherein the processor, when executing the computer program, implements the steps of the device repairing method stated above.

Figure 5:
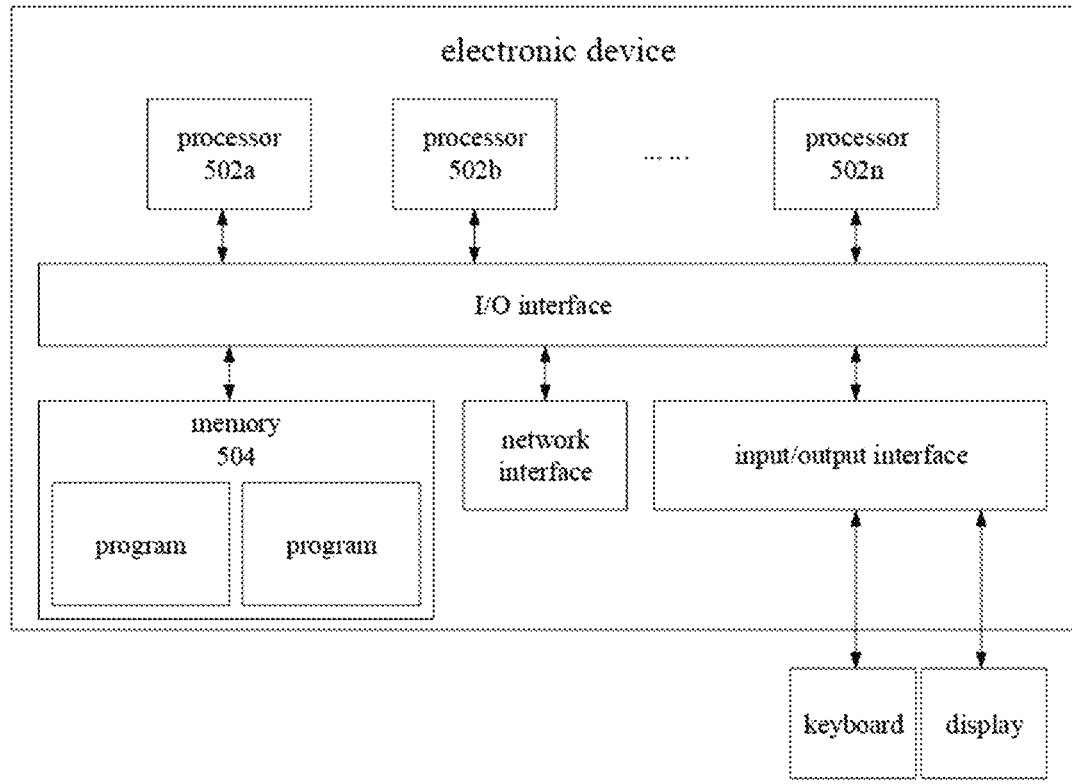
FIG. 5 is a block diagram of the hardware structure of an electronic device (or mobile device) for a device repairing method according to an embodiment of the present application.

FIG. 5 is a block diagram of the hardware structure of an electronic device (or mobile device) for a device repairing method according to an embodiment of the present application. As shown in FIG. 5, the electronic device may include one or more (shown in FIG. 5 by 502a, 502b, . . . , 502n) processors 502 (the processors 502 may include but are not limited to a processing device such as a microprocessor MCU or a programmable logic device FPGA), and a memory 504 configured for storing data. Besides them, it may further include a display, an input/output interface (I/O interface), a universal serial bus (USB) port (which may be included as one of the ports of the I/O interface), a network interface, a keyboard, a power supply and/or a camera. A person skilled in the art may understand that the structure shown in FIG. 5 is merely illustrative, and does not limit the structure of the electronic device. For example, the electronic device may also include more or fewer components than those shown in FIG. 5, or have a different configuration from that shown in FIG. 5.

The serial numbers of the embodiments of the present application are merely for the purpose of description, and do not indicate the relative preferences of the embodiments.

In the above embodiments of the present application, the descriptions on the embodiments have respective emphases, and the parts of a certain embodiment that are not described in detail may refer to the relevant descriptions on the other embodiments.

In the embodiments according to the present application, it should be understood that the disclosed technical contents may be implemented in other manners. The above-described device embodiments are merely illustrative. For example, the division between the units may be a division in the logic functions, in practical implementations there may be another mode of division. For example, multiple units or components may be combined or may be integrated into another system, or some of the features may be omitted, or not implemented. Additionally, the coupling or direct coupling or communicative connection between the illustrated or discussed components may be via interfaces or the indirect coupling or communicative connection between the units or modules, and may be electric or in other forms.

The units that are described as separate components may or may not be physically separate, and the components that are displayed as units may or may not be physical units; in other words, they may be located at the same one location, and may also be distributed to a plurality of units. Some or all of the units may be selected according to practical demands to realize the purposes of the solutions of the embodiments.

Furthermore, the functional units according to the embodiments of the present application may be integrated into one processing unit, or the units may also separately physically exist, or two or more of the units may also be integrated into one unit. The above-described integrated units may be embodied in the form of hardware, and may also be embodied in the form of a software function unit.

The integrated units, if embodied in the form of software function units and sold or used as an independent product, may be stored in a non-transitory storage medium. On the basis of such a comprehension, the substance of the technical solutions of the present application, or the part thereof that makes a contribution over the prior art, or the whole or part of the technical solutions, may be embodied in the form of a software product. The computer software product is stored in a non-transitory storage medium, and contains multiple instructions configured so that a computer device (which may be a personal computer, a server, a network device and so on) implements all or some of the steps of the methods according to the embodiments of the present application. Moreover, the above non-transitory storage medium include various media that may store a program code, such as a USB flash disk, a ROM (Read-Only Memory), a RAM (Random Access Memory), a mobile hard disk drive, a diskette and an optical disk.

The above are merely alternative embodiments of the present application. It should be noted that a person skilled in the art may make various improvements without departing from the principle of the present application, wherein those improvements should be considered as falling within the protection scope of the present application.

The invention claimed is:

1. A device repairing method, comprising:
   collecting a device-parameter set of a target device;
   based on the device-parameter set, determining whether a to-be-repaired component exists among a plurality of device components of the target device, to obtain a determination result;
   in response to the determination result indicating that the to-be-repaired component exists, repairing the to-be-repaired component by operating a preset port in the to-be-repaired component, to obtain a repairment result, wherein the preset port is determined by counting up port data of all ports within a historical time period; and
   determining whether the to-be-repaired component is repaired according to the repairment result, and in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period;
   wherein the preset port is a link disabling port, and the method further comprises:
   controlling the link disabling port to guide a link training and status state machine to a disabling state, wherein a disabling state machine is configured for disabling device links of the target device, and the device links are links between the target device and the device components.

2. The device repairing method according to claim 1, wherein the step of collecting the device-parameter set of the target device comprises:
   collecting component parameters of all of the device components that are connected to the target device, to obtain the device-parameter set, wherein the component parameters include at least a speed parameter and a bandwidth parameter.

3. The device repairing method according to claim 2, wherein the step of, based on the device-parameter set, determining whether the to-be-repaired component exists among the plurality of device components of the target device comprises:
   for each of the device components, determining a preset speed value when the device component and the target device perform data transmission and a preset speed threshold associated with each of preset speed values;
   extracting the component parameters associated with the device component from the device-parameter set;
   in response to a value of the speed parameter among the component parameters being unequal to the preset speed value, determining whether the value of the speed parameter is less than the preset speed threshold; and
   in response to the value of the speed parameter being less than the preset speed threshold, determining that the device component is the to-be-repaired component.

4. The device repairing method according to claim 2, wherein the step of, based on the device-parameter set, determining whether the to-be-repaired component exists among the plurality of device components of the target device further comprises:
   for each of the device components, determining a preset bandwidth threshold when the device component and the target device perform data transmission;
   extracting the component parameters associated with the device component from the device-parameter set; and in response to a value of the bandwidth parameter among the component parameters being less than the preset bandwidth threshold, determining that the device component is the to-be-repaired component.

5. The device repairing method according to claim 1, wherein the device components are deployed with a preset register, and the preset register is provided with the preset port.

6. The device repairing method according to claim 5, wherein before the step of repairing the to-be-repaired component by operating the preset port in the to-be-repaired component, to obtain the repairment result, the method further comprises:
   acquiring port data of all ports in the preset register; and
   based on the port data, determining the preset port from the all ports.

7. The device repairing method according to claim 1, wherein the step of repairing the to-be-repaired component by operating the preset port in the to-be-repaired component, to obtain the repairment result comprises:
   closing the preset port in the to-be-repaired component;
   in response to a closing duration reaching a first preset duration, opening the preset port in the to-be-repaired component; and
   in response to an opening duration reaching a second preset duration, obtaining the repairment result, wherein the repairment result is characterized by a degradation state, and the degradation state refers to decreasing of a data transmission speed or data transmission bandwidth between the to-be-repaired component and the target device.

8. The device repairing method according to claim 7, wherein the step of closing the preset port in the to-be-repaired component comprises:
   writing a preset port bit of the preset port to be a first preset value, wherein the first preset value is for characterizing execution of a closing operation to the preset port.

9. The device repairing method according to claim 7, wherein the step of opening the preset port in the to-be-repaired component comprises:
   writing a preset port bit of the preset port to be a second preset value, wherein the second preset value is for characterizing execution of an opening operation to the preset port.

10. The device repairing method according to claim 7, wherein the step of determining whether the to-be-repaired component is repaired according to the repairment result comprises:
   based on the degradation state, determining a current repairment probability;
   in response to the current repairment probability being less than a preset probability threshold, determining that the to-be-repaired component is not repaired; and
   in response to the current repairment probability being greater than or equal to the preset probability threshold, determining that the to-be-repaired component is repaired.

11. The device repairing method according to claim 1, wherein after the step of repairing the to-be-repaired component by operating the preset port in the to-be-repaired component, to obtain the repairment result, the method further comprises:
   updating the repairment result of the to-be-repaired component; and
   storing the repairment result that is updated to a preset log.

12. The device repairing method according to claim 1, wherein after the repairment result indicates that the to-be-repaired component is repaired or the repairment time quantity reaches the preset time-quantity threshold, the method further comprises:
   starting up a preset system in the target device.

13. The device repairing method according to claim 1, wherein the target device is deployed with a preset system.

14. The device repairing method according to claim 1, wherein the target device is provided with a plurality of external plug-in interfaces, and the external plug-in interfaces are for connecting the device components.

15. The device repairing method according to claim 12, wherein the preset system is a basic input output system.

16. The device repairing method according to claim 5, wherein the preset register is a link control register.

17. A device repairing system based on a preset system, wherein the device repairing system comprises:
   a target device configured for, when repairment by a controller on the target device is completed, starting up the preset system, wherein the preset system is deployed in the target device, the target device is provided with a plurality of device components, the device components are deployed with a preset register, and the preset register is provided with a preset port; and
   the controller configured for collecting a device-parameter set of the target device; based on the device-parameter set, determining whether a to-be-repaired component exists among the plurality of device components, to obtain a determination result; in response to the determination result indicating that the to-be-repaired component exists, repairing the to-be-repaired component by operating the preset port in the to-be-repaired component, to obtain a repairment result; and determining whether the to-be-repaired component is repaired according to the repairment result, in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, and determining that repairment on the target device is completed, wherein the preset port is determined by counting up port data of all ports within a historical time period, and the preset time-quantity threshold is determined by analyzing a historical datum within the historical time period;
   wherein the preset port is a link disabling port, and the controller is further configured for:
   controlling the link disabling port to guide a link training and status state machine to a disabling state, wherein a disabling state machine is configured for disabling device links of the target device, and the device links are links between the target device and the device components.

18. A non-transitory storage medium, wherein the non-transitory storage medium stores a computer program, and the computer program, when executed by a processor, implements operations comprising:
   collecting a device-parameter set of a target device;
   based on the device-parameter set, determining whether a to-be-repaired component exists among a plurality of device components of the target device, to obtain a determination result;

in response to the determination result indicating that the to-be-repaired component exists, repairing the to-be-repaired component by operating a preset port in the to-be-repaired component, to obtain a repairment result, wherein the preset port is determined by counting up port data of all ports within a historical time period; and determining whether the to-be-repaired component is repaired according to the repairment result, and in response to the to-be-repaired component being not repaired, repeatedly executing the step of repairing the to-be-repaired component by operating the preset port in the to-be-repaired component, till the repairment result indicates that the to-be-repaired component is repaired or a repairment time quantity reaches a preset time-quantity threshold, wherein the preset time-quantity threshold is determined by analyzing a historical datum within the historical time period;

wherein the preset port is a link disabling port, and the operations further comprise:

controlling the link disabling port to guide a link training and status state machine to a disabling state, wherein a disabling state machine is configured for disabling device links of the target device, and the device links are links between the target device and the device components.

19. An electronic device, comprising a memory, a processor, and a computer program that is stored in the memory and executable in the processor, wherein the processor, when executing the computer program, implements the steps of the device repairing method according to claim 1.

* * * * *